(12) United States Patent
Park et al.

(10) Patent No.: US 11,392,225 B2
(45) Date of Patent: Jul. 19, 2022

(54) ELECTRONIC DEVICE AND STYLUS PEN CHARGING METHOD USING SAME

(71) Applicant: Samsung Electronics Co., Ltd., Gyeonggi-do (KR)

(72) Inventors: Junghui Park, Gyeonggi-do (KR); Yongwoon Kim, Gyeonggi-do (KR); Sungjun Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/263,353

(22) PCT Filed: Jul. 19, 2019

(86) PCT No.: PCT/KR2019/008936
§ 371 (c)(1),
(2) Date: Jan. 26, 2021

(87) PCT Pub. No.: WO2020/022702
PCT Pub. Date: Jan. 30, 2020

(65) Prior Publication Data
US 2021/0325981 A1 Oct. 21, 2021

(30) Foreign Application Priority Data

Jul. 27, 2018 (KR) .......................... 10-2018-0087638

(51) Int. Cl.
*G06F 1/26* (2006.01)
*G06F 3/0354* (2013.01)
(Continued)

(52) U.S. Cl.
CPC ........ *G06F 3/03545* (2013.01); *G06F 3/0383* (2013.01); *H02J 50/12* (2016.02); *G06F 2203/0384* (2013.01)

(58) Field of Classification Search
CPC ............... G06F 3/03545; G06F 3/0383; G06F 2203/0384; G06F 1/3215; G06F 1/26;
(Continued)

(56) References Cited

U.S. PATENT DOCUMENTS

2001/0001430 A1* 5/2001 Ely ..................... G06F 3/03545
178/18.03
2003/0103039 A1* 6/2003 Burr ..................... G06F 3/0395
345/163
(Continued)

FOREIGN PATENT DOCUMENTS

| EP | 2933710 | 10/2015 |
|---|---|---|
| KR | 1020160068099 | 6/2016 |
| KR | 1020180013307 | 2/2018 |

OTHER PUBLICATIONS

PCT/ISA/210 Search Report issued on PCT/KR2019/008936, dated Oct. 29, 2019, pp. 5.
(Continued)

*Primary Examiner* — Lunyi Lao
*Assistant Examiner* — Jarurat Suteerawongsa
(74) *Attorney, Agent, or Firm* — The Farrell Law Firm, P.C.

(57) ABSTRACT

According to various embodiments of the present invention, an electronic device comprises: a housing which comprises a first plate, a second plate facing the opposite direction from the first plate and a lateral member surrounding a space between the first plate and second plate; a hole which is formed through the lateral member and is connected to the space; a stylus pen which can be inserted to the space through the hole, wherein the stylus pen comprises a pen housing extending long between a first end part and a second end part and a first coil positioned inside the pen housing, wound about the axis in a first direction extending from the first end part to the second end part and having the coil (Continued)

length of a first length; a second coil which is disposed inside the space of the housing so as to partly face the first coil of the stylus pen when the stylus pen is fully inserted to the housing, wherein the second coil comprises a conductive wire extending over a first area facing the first coil and a second area not facing the first coil, wherein the conductive wire has a first width in the first area and a second width, which is smaller than the first width, in the second area; and a charging circuit which is electrically connected to the second coil. Other various embodiments other than the various embodiments disclosed in the present invention are possible.

13 Claims, 10 Drawing Sheets

(51) Int. Cl.
*H02J 50/12* (2016.01)
*G06F 3/038* (2013.01)

(58) Field of Classification Search
CPC .. G06F 1/1626; G06F 2200/1632; G06F 1/16; H02J 50/12; H02J 50/10; Y10T 70/5031; H01F 38/14
See application file for complete search history.

(56) References Cited

U.S. PATENT DOCUMENTS

| | | |
|---|---|---|
| 2011/0074342 A1* | 3/2011 | MacLaughlin ......... H02J 50/80 320/108 |
| 2012/0235636 A1 | 9/2012 | Partovi |
| 2014/0247006 A1* | 9/2014 | Yu .......................... G06F 1/1626 320/108 |
| 2015/0130772 A1 | 5/2015 | Katsurahira |
| 2016/0190839 A1 | 6/2016 | Otsuka et al. |
| 2016/0313814 A1* | 10/2016 | Jacobs .................... G06F 21/32 |
| 2017/0371434 A1* | 12/2017 | Kobori .................... G06F 3/046 |
| 2018/0032160 A1 | 2/2018 | Park et al. |

OTHER PUBLICATIONS

PCT/ISA/237 Written Opinion issued on PCT/KR2019/008936, dated Oct. 29, 2019, pp. 5.

* cited by examiner

ELECTRONIC DEVICE AND STYLUS PEN CHARGING METHOD USING SAME

PRIORITY

This application is a National Phase Entry of PCT International Application No. PCT/KR2019/008936 which was filed on Jul. 19, 2019, and claims priority to Korean Patent Application No. 10-2018-0087638, which was filed on Jul. 27, 2018, the content of each of which is incorporated herein by reference.

TECHNICAL FIELD

Various embodiments of the disclosure relate to an electronic device and a method for charging a stylus pen by using the same.

BACKGROUND ART

An electronic device can receive inputs from the user through a touch screen, and is provided with an additional input means, such as a stylus pen, such that the user can make more precise touch inputs (or hovering inputs). The stylus pen can be mounted in a space inside the electronic device, and may be provided such that the same can be attached to/detached from the electronic device. Such a stylus pen has a battery mounted therein, and the battery can be charged through the electronic device. For example, if a magnetic field is produced in the coil of the electronic device, an electric current flows in the coil of the stylus pen by means of electromagnetic induction, and the battery of the stylus pen can be charged thereby.

DISCLOSURE OF INVENTION

Technical Problem

When a stylus pen is inserted into an electronic device, and when the battery of the stylus pen is charged, the magnetic field produce by the coil provided in the electronic device may be dispersed by the structure of the coil provided in the stylus pen and the coil provided in the electronic device, thereby degrading the stylus pen charging efficiency. An electronic device according to various embodiments of the disclosure may have a coil having a length larger than that of the coil provided in the stylus pen. The electronic device may have a conductor provided additionally to produce the magnetic field necessary to charge the battery of the stylus pen.

Solution to Problem

An electronic device according to various embodiments of the disclosure may include: a housing including a first plate, a second plate facing away from the first plate, and a side member surrounding a space between the first plate and the second plate; a hole formed through the side member and connected to the space; a stylus pen which can be inserted into the space through the hole, the stylus pen including a pen housing elongated between a first end and a second end, and a first coil positioned inside the pen housing and wound around axis in a first direction extending from the first end to the second end, the first coil having a coil length corresponding to a first length; a second coil disposed in the space of the housing so as to face a part of the first coil of the stylus pen when the stylus pen is fully inserted into the housing, the second coil including a conductive wire extending across a first area facing the first coil and a second area not facing the first coil, the conductive wire having a first width in the first area and having a second width smaller than the first width in the second area; and a charging circuit electrically connected to the second coil.

An electronic device according to various embodiments of the disclosure may include: a housing including a first plate, a second plate facing away from the first plate, and a side member surrounding a space between the first plate and the second plate; a hole formed through the side member and connected to the space; a stylus pen which can be inserted into the space through the hole, the stylus pen including a pen housing elongated between a first end and a second end, and a first coil positioned inside the pen housing and wound around axis in a first direction extending from the first end to the second end, the first coil having a coil length corresponding to a first length; a second coil disposed in the space of the housing so as to face a part of the first coil of the stylus pen when the stylus pen is fully inserted into the housing; a conductor positioned inside the housing so as to face the first coil with the stylus pen interposed therebetween when the stylus pen is fully inserted into the housing; and a charging circuit electrically connected to the second coil.

Advantageous Effects of Invention

An electronic device according to various embodiments of the disclosure has a coil having a length larger than that of the coil provided in the stylus pen such that dispersion of the magnetic field produced by the coil having the larger length can be prevented, thereby improving the charging efficiency.

An electronic device according to various embodiments of the disclosure has a conductor provided in addition to the coil such that the amount of produced magnetic field can be increased, thereby shortening the time necessary to charge the battery of the stylus pen.

MODE FOR THE INVENTION

Figure 1:
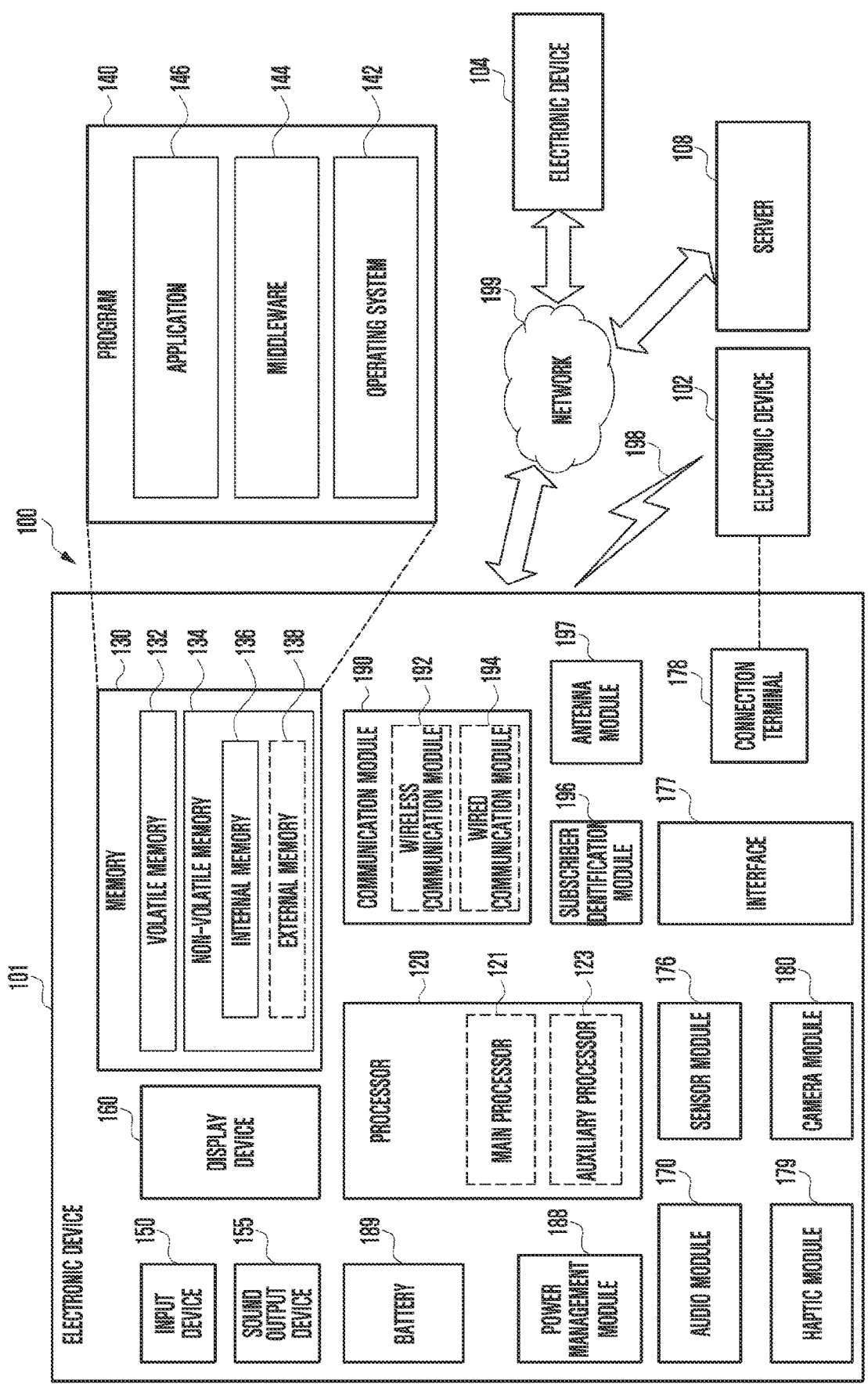
FIG. 1 is a block diagram of an electronic device including a stylus pen inside a network environment according to various embodiments.

FIG. 1 is a block diagram of an electronic device including a stylus pen inside a network environment according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) (e.g., a wireless transceiver) or a wired communication module 194 (e.g., a local area network (LAN) communication module or a power line communication (PLC) module) (e.g., a wired transceiver). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may be formed in a conductor or a conductive pattern. According to an embodiment, the antenna module 197 may further include other components (e.g., a radio frequency integrated circuit (RFIC)) in addition to the conductor or the conductive pattern. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
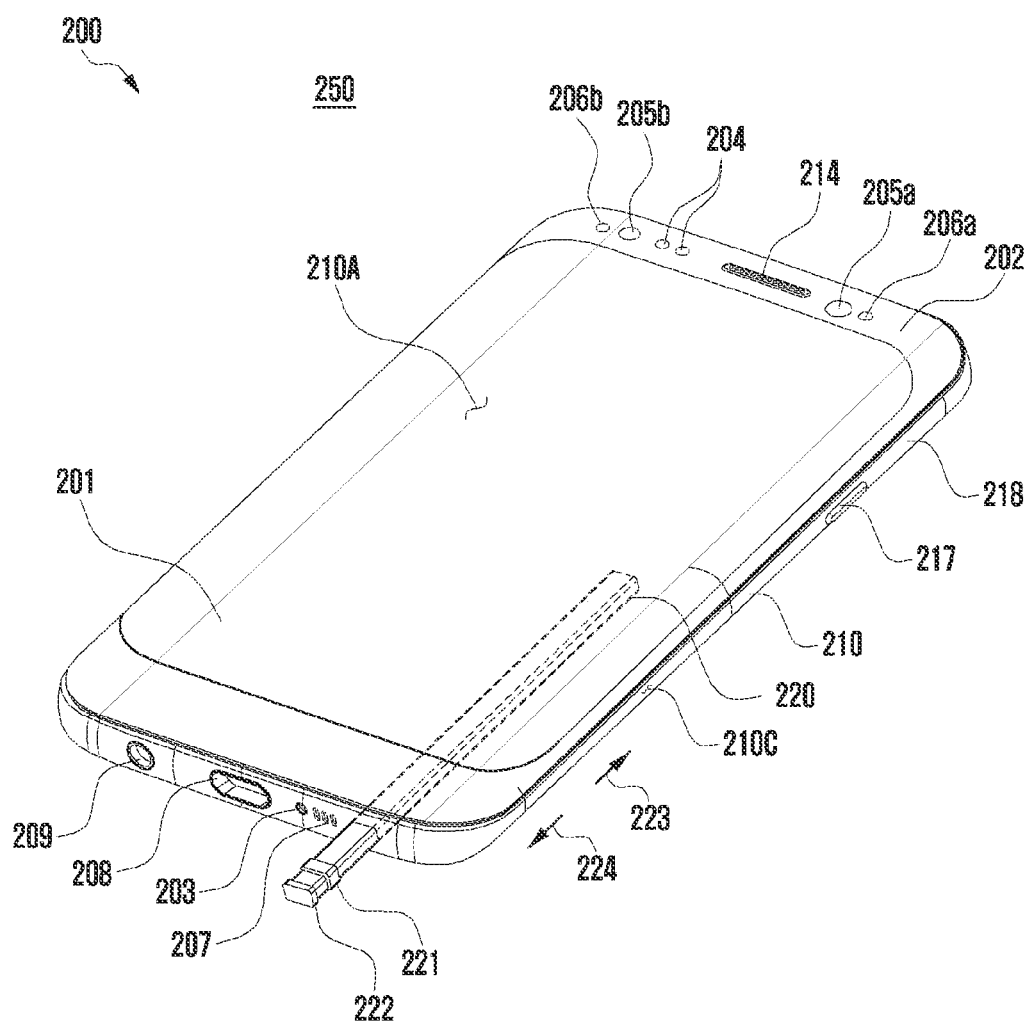
FIG. 2 is a front perspective view of an electronic device including a stylus pen according to various embodiments of the disclosure.

FIG. 2 is a front perspective view of an electronic device including a stylus pen according to various embodiments of the disclosure.

Figure 3:
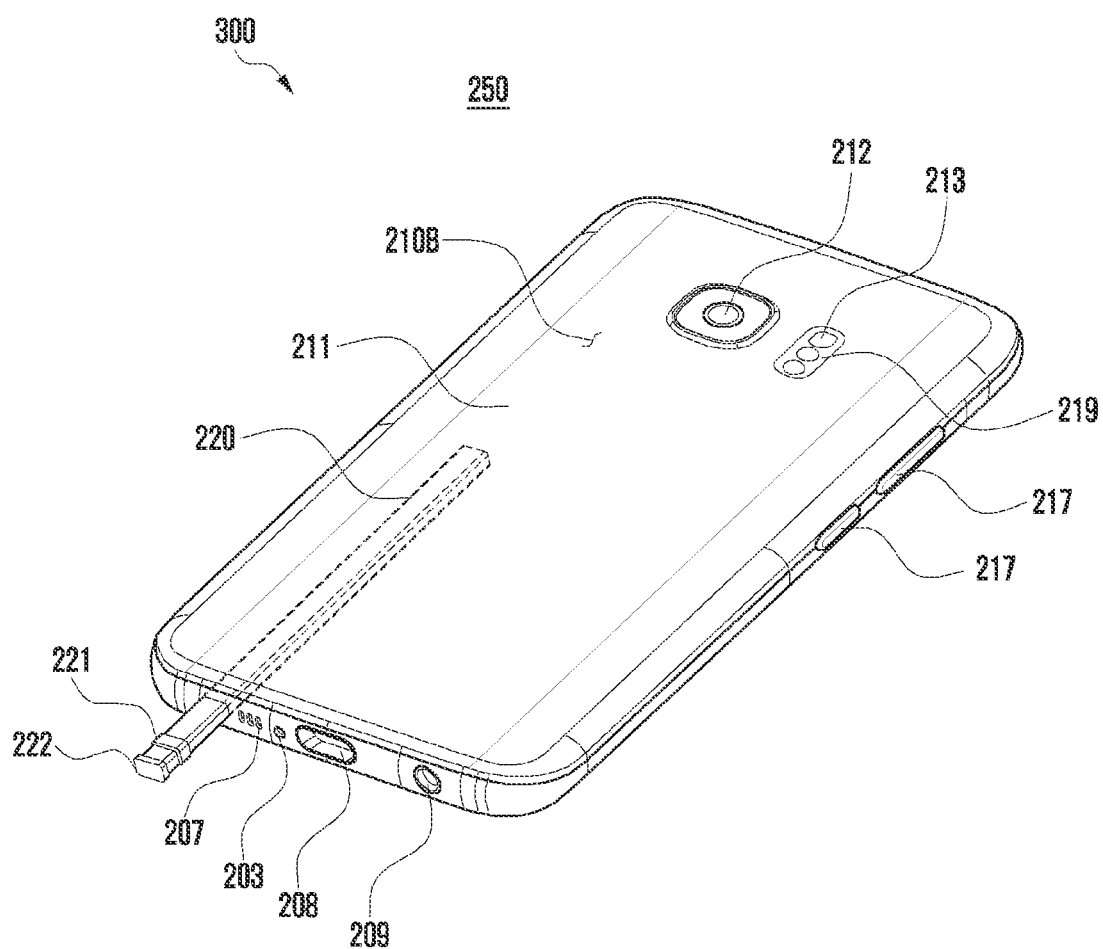
FIG. 3 is a rear perspective view of an electronic device including a stylus pen according to various embodiments of the disclosure.

FIG. 3 is a rear perspective view of an electronic device including a stylus pen according to various embodiments of the disclosure.

Referring to FIGS. 2 and 3, the electronic device 250 (e.g., the electronic device 101 of FIG. 1) according to various embodiments may include a housing 210 including a first surface (or front surface) 210A, a second surface (or rear surface) 210B, and a side surface 210C enclosing a space between the first surface 310A and the second surface 210B. In one embodiment (not illustrated), the housing may refer to a structure forming some of the first surface 210A, the second surface 210B, and the side surface 210C. According to one embodiment, the first surface 210A may be formed by an at least partially substantially transparent front plate 202 (e.g., a polymer plate or a glass plate including various coating layers). The second surface 210B may be formed by a substantially opaque rear plate 211. The rear plate 211 may be formed by, for example, coated or colored glass, ceramic, polymer, metal (e.g., aluminum, stainless steel (STS), or magnesium), or a combination of at least two of the above materials. The side surface 210C may be coupled to the front plate 202 and the rear plate 211 and be formed by a side bezel structure (or "side member") 218 including a metal and/or a polymer. In some embodiments, the rear plate 211 and the side bezel structure 218 may be integrally formed and include the same material (e.g., metal material such as aluminum).

According to one embodiment, the electronic device 250 may include at least one of a display 201; audio modules 203, 207, and 214; sensor modules 204 and 219; camera modules 205a, 205b, 206a, 212, and 213; key input device 217; indicator 206b; and connector holes 208 and 209. In some embodiments, the electronic device 250 may omit at least one (e.g., the key input device 217 or the indicator 206b) of the components or may further include other components.

The display 201 may be exposed through, for example, a substantial portion of the front plate 202. In one embodiment, the display 201 may be coupled to or disposed adjacent to a touch detection circuit, a pressure sensor capable of measuring intensity (pressure) of the touch, and/or a digitizer for detecting a stylus pen of a magnetic field method.

The audio modules 203, 207, and 214 may include a microphone hole 203 and speaker holes 207 and 214. The microphone hole 203 may dispose a microphone for obtaining an external sound therein, and, in some embodiments, a plurality of microphones may be disposed to detect a direction of a sound. The speaker holes 207 and 214 may include an external speaker hole 207 and a call receiver hole 214. In some embodiments, the speaker holes 207 and 214 and the microphone hole 203 may be implemented into one hole, or the speaker may be included without the speaker holes 207 and 214 (e.g., piezo speaker).

The sensor modules 204 and 219 may generate an electrical signal or a data value corresponding to an operating state inside the electronic device 250 or an environment state outside the electronic device 250. The sensor modules 204 and 219 may include, for example, a first sensor module 204 (e.g., proximity sensor) and/or a second sensor module (not illustrated) (e.g., fingerprint sensor), disposed at the first surface 210A of the housing 210, and/or a third sensor module 219 (e.g., a heart rate monitor (HRM) sensor) disposed at the second surface 210B of the housing 210. The electronic device 250 may further include a sensor module (not illustrated), for example, at least one of a gesture sensor, gyro sensor, air pressure sensor, magnetic sensor, acceleration sensor, grip sensor, color sensor, IR sensor, biometric sensor, temperature sensor, humidity sensor.

The camera modules 205a, 205b, 206a, 212, and 213 may include a first camera device 205a and a second camera device 205b (e.g., an iris recognition camera) disposed at the first surface 210A of the electronic device 250, a third camera device 212 disposed at the second surface 210B and/or a flash 206a and 213. The camera modules 205a, 205b, 206a, 212, and 213 may include one or a plurality of lenses, an image sensor, and/or an image signal processor. The flash 206a and 213 may include, for example, a light emitting diode or a xenon lamp. In some embodiments, two or more lenses (infrared camera, wide angle and telephoto lens) and image sensors may be disposed at one surface of the electronic device 250.

The key input device 217 may be disposed at the side surface 210C of the housing 210. In another embodiment (not illustrated), the electronic device 250 may include a home key button and/or a touch pad disposed around the home key button disposed at the first surface 210A of the housing 210. In one embodiment, the electronic device 250 may not include some or all of the above-described key input devices 217, and the key input device 217 that is not included may be implemented in other forms such as a soft key on the display 201. In some embodiments, the key input device 317 may include a sensor module 316 disposed at the second surface 310B of the housing 310.

The indicator 206b may be disposed at, for example, the first surface 210A of the housing 210. The indicator 206b may provide, for example, status information of the electronic device 250 in an optical form. In one embodiment, indicator 206b may include, for example, a light emitting diode (LED), an IR LED, and a xenon lamp.

The connector holes 208 and 209 may include a first connector hole 208 that may receive a connector (e.g., a USB connector) for transmitting and receiving power and/or data to and from an external electronic device and/or a second connector hole (e.g., earphone jack) 209 that can receive a connector for transmitting and receiving audio signals to and from an external electronic device.

According to an embodiment, the electronic device 250 may include a stylus pen 221. The stylus pen 221 may be used to make a touch input (or a hovering input) on the display 201 (or touch screen) of the electronic device 250. The housing 210 of the electronic device 250 may have a containing space 220 (or a pen pocket) formed in a part thereof such that the stylus pen 221 can be inserted therein. The containing space 220 may have an elongated shape similar to that of the stylus pen 221 such that the stylus pen 221 can be inserted therein 223 or separated therefrom 224. In an embodiment, the stylus pen 221 may include an ejection button 222. The ejection button 222 may be exposed to the outside of the stylus pen 221. In an embodiment, the ejection button 222 may include a push button that provides the user with a click feeling or a button having an engaging structure formed thereon such that the user can remove (for example, separate) the stylus pen 221 from the containing space 220 by using his/her fingernail. In an embodiment, the entrance of the containing space 220 may be provided in the lower end of the housing 210 of the electronic device 250, but is not limited thereto, and the same may be configured such that the stylus pen 221 can be inserted inwards from the upper end or side surface thereof.

Figure 4:
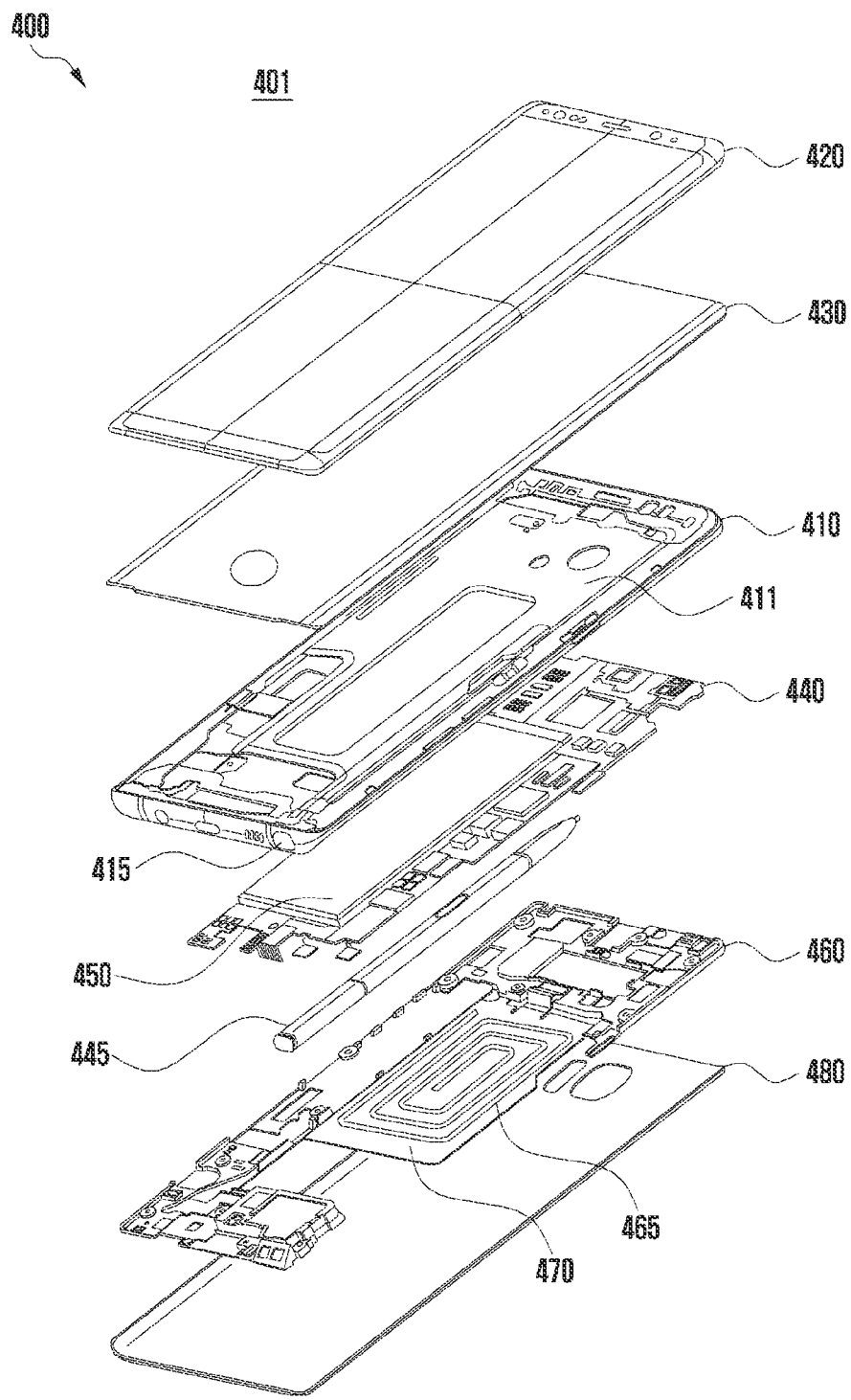
FIG. 4 is an exploded perspective view of an electronic device including a stylus pen according to various embodiments.

FIG. 4 is an exploded perspective view 400 an electronic device including a stylus pen according to various embodiments Referring to FIG. 4, the electronic device 401 (e.g., the electronic device 101 of FIG. 1, the electronic device 250 of FIG. 2) may include a side bezel structure 410 (e.g., the side bezel structure 218 of FIG. 2), first support member 411 (e.g., bracket), front plate 420 (e.g., the front plate 202 of FIG. 2), display 430 (e.g., the display 201 of FIG. 2), printed circuit board 440, battery 450 (e.g., battery 189 of FIG. 1), second support member 460 (e.g., rear case), magnetic coils FPCB (flexible printed circuit board) 470, and rear plate 480 (e.g., the rear plate 211 of FIG. 3). In some embodiments, the electronic device 401 may omit at least one (e.g., the first support member 411 or the second support member 460) of the components or may further include other components.

At least one of the components of the electronic device 401 may be the same as or similar to at least one of the components of the electronic device 101 of FIG. 3, the electronic device 250 of FIG. 2 or 3 and a duplicated description is omitted below.

The first support member 411 (e.g., bracket) may be disposed inside the electronic device 401 to be connected to the side bezel structure 410 or may be integrally formed with the side bezel structure 410. The first support member 411 may be made of, for example, a metal material and/or a non-metal (e.g., polymer) material. In the first support member 411, the display 430 may be coupled to one surface thereof, and the printed circuit board 440 may be coupled to the other surface thereof. The first support member 411 may have a containing space 415 (or a pen pocket) (for example, the containing space 220 of FIG. 2 and FIG. 3) formed therein such that the stylus pen 445 (for example, the stylus pen 221 of FIG. 2 and FIG. 3) can be inserted therein. The containing space 415 may have an elongated shape similar to that of the stylus pen 445 such that the stylus pen 445 can be inserted therein or separated therefrom. In the printed circuit board 440, a processor (e.g., the processor 120 of FIG. 1), a memory (e.g., the memory 130 of FIG. 1), and/or an interface (e.g., the interface 177 of FIG. 1) may be mounted. The processor may include, for example, one or more of a central processing unit, application processor, graphic processing unit, image signal processor, sensor hub processor, or communication processor.

The battery 450 may be disposed, for example, on substantially the same plane as that of the printed circuit board 440. The battery 450 may be integrally disposed inside the electronic device 401 or may be detachably disposed in the electronic device 401.

According to an embodiment, the magnetic coils FPCB 470 may be disposed substantially on the same plane as that of the second support member 460 (e.g., a rear case). The magnetic coils FPCB 470 may include a flat coil pattern 465 composed of a plurality of layers. The magnetic coils FPCB 470 may include a plurality of coils for wireless charging, magnetic payment, and/or NFC.

Figure 5:
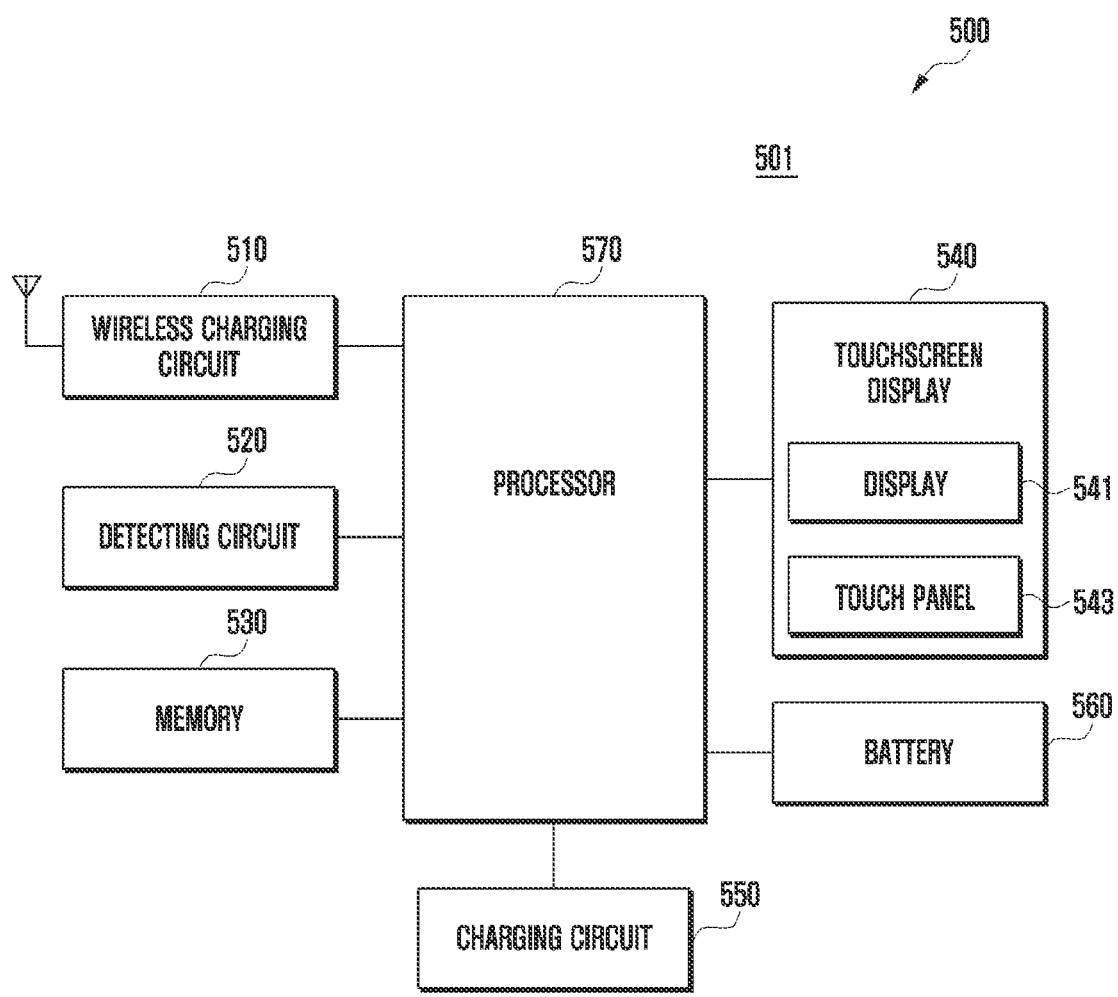
FIG. 5 is a block diagram illustrating an electronic device according to various embodiments of the disclosure.

FIG. 5 is a block diagram 500 illustrating an electronic device according to various embodiments of the disclosure.

Referring to FIG. 5, the electronic device 501 (for example, the electronic device 101 in FIG. 1, the 250 in FIG. 2, or the electronic device 401 in FIG. 4) may include a wireless communication circuit 510 (for example, the wireless communication module 192 in FIG. 1), a detecting circuit 520, a memory 530 (for example, the memory 130 in FIG. 1), a touchscreen display 540 (for example, the display device 160 in FIG. 1), a charging circuit 550, a battery 560 (for example, the battery 189 in FIG. 1), and a processor 570 (for example, the processor 120 in FIG. 1)).

In an embodiment, the wireless communication circuit 510 may establish communication between the electronic device 501 and an external electronic device (for example, the electronic device 102 or 104 or the server 108 in FIG. 1) and/or a stylus pen (for example, the stylus pen 221 in FIG. 2 or the stylus pen 445 in FIG. 4). The wireless communication circuit 510 may include at least one antenna and a communication processor (CP). The wireless communication circuit 510 may communicate with the wireless communication circuit of the stylus pen 221 by using at least one of various types of short-range wireless communication schemes. For example, the short-range wireless communication schemes may include Bluetooth Low Energy (BLE), but are not limited thereto.

In an embodiment, the detecting circuit 520 may detect whether the stylus pen 221 is inserted into or separated from the containing space (for example, the containing space 220 in FIG. 2 or the containing space 415 in FIG. 4) formed in a part of the housing (for example, the housing 210 in FIG. 2) of the electronic device 501 such that the stylus pen 221 can be inserted, and may deliver a detecting signal regarding the insertion or separation to the processor 570. For example, the detecting circuit 520 may detect whether or not the stylus pen 221 is inserted into the electronic device 501, based on a change in the current value of a detecting coil (not illustrated) for example, the flat coil pattern 465 in FIG. 4).

In an embodiment, the memory 530 may store a predefined condition for detecting whether or not the stylus pen 221 is inserted into the electronic device 501 (for example, a current value when the stylus pen 221 is inserted into the electronic device 501, a current value when the stylus pen 221 is separated from the electronic device 501). The memory 530 may store a program for charging the battery of the stylus pen 221 according to whether or not the stylus pen 221 is inserted into the electronic device 501, for example, a control program for controlling each component.

In an embodiment, the touchscreen display 540 may include a display 541 and a touch panel 543 in an integral type.

In an embodiment, the touchscreen display 540 may display images under the control of the processor 570, and may be implemented as one of a liquid crystal display (LCD), a light-emitting diode (LED) display, an organic light-emitting diode (OLED) display, a micro-electro-mechanical systems (MEMS) display, or an electronic paper display, but is not limited thereto. The display 541 may display various contents (for example, texts, images, videos, icons, or symbols) to the user, for example. The touch panel 543 may receive a touch, gesture, proximity, or hovering input using, for example, the stylus pen 221 or a part of the user's body.

In an embodiment, the display 541 may display the charging status (for example, being charged, fully charged, or the like) of the stylus pen 221 under the control of the processor 570. The display 541 may display the expected time to fully charge the stylus pen 221 under the control of the processor 570.

In an embodiment, the charging circuit 550 may receive a current for charting the stylus pen 221 from the battery 560, and may deliver the received current to the detecting coil (not illustrated). In an embodiment, the charging circuit 550 may include an electro-magnetic resonance (EMR) charging circuit.

In an embodiment, the current received from the charging circuit 550 may produce a magnetic field in the detecting coil (not illustrated). The magnetic field may be produced in the containing space of the electronic device 501, into which the stylus pen 221 is inserted (for example, the containing space 220 in FIG. 2 or the containing space 415 in FIG. 4).

In an embodiment, the detecting coil (not illustrated) may include a flat coil pattern (for example, the flat coil pattern 465 in FIG. 4). In an embodiment, the flat coil pattern 465 may be configured in a specific shape (for example, in the shape of letter "8", the infinity (∞), or the like). In an embodiment, the detecting coil (not illustrated) may be formed on a plane facing the stylus pen 221 inside the housing 210. The detecting coil (not illustrated) may have a larger length than the length of the coil (for example, solenoid coil) provided in the stylus pen 221 and the length of ferrite core provided therein. In an embodiment, the detecting coil (not illustrated) may include a conductive wire extending across a first area that faces the coil provided in the stylus pen 221 and a second area that does not face the same. The conductive wire may have a first width in the first area and a second width, which is smaller than the first width, in the second area.

In an embodiment, the processor 570 may control the overall operation of the electronic device 501 and the flow of signals between internal components of the electronic device 501, may conduct data processing, and may control supply of power from the battery 560 to the components.

In an embodiment, the processor 570 may detect, through the detecting circuit 520, whether or not the stylus 221 is inserted into the electronic device 501. If the stylus pen 221 is inserted therein, the processor 570 may receive a current from the battery 560 and deliver the same to the charging circuit 550. The charging circuit 550 may deliver the current received from the battery 560 to the detecting coil (not illustrated) under the control of the processor 570.

In an embodiment, by means of the current received from the charging circuit 550, the detecting coil (not illustrated) may produce a magnetic field inside the containing space formed in a part of the housing 210.

In an embodiment, the electronic device 501 may have at least one conductor provided inside the housing 210 and disposed so as to face the coil of the stylus pen 221 with the stylus pen 221 interposed therebetween. In an embodiment, a magnetic field may be produced in the at least one conductor.

Figure 6:
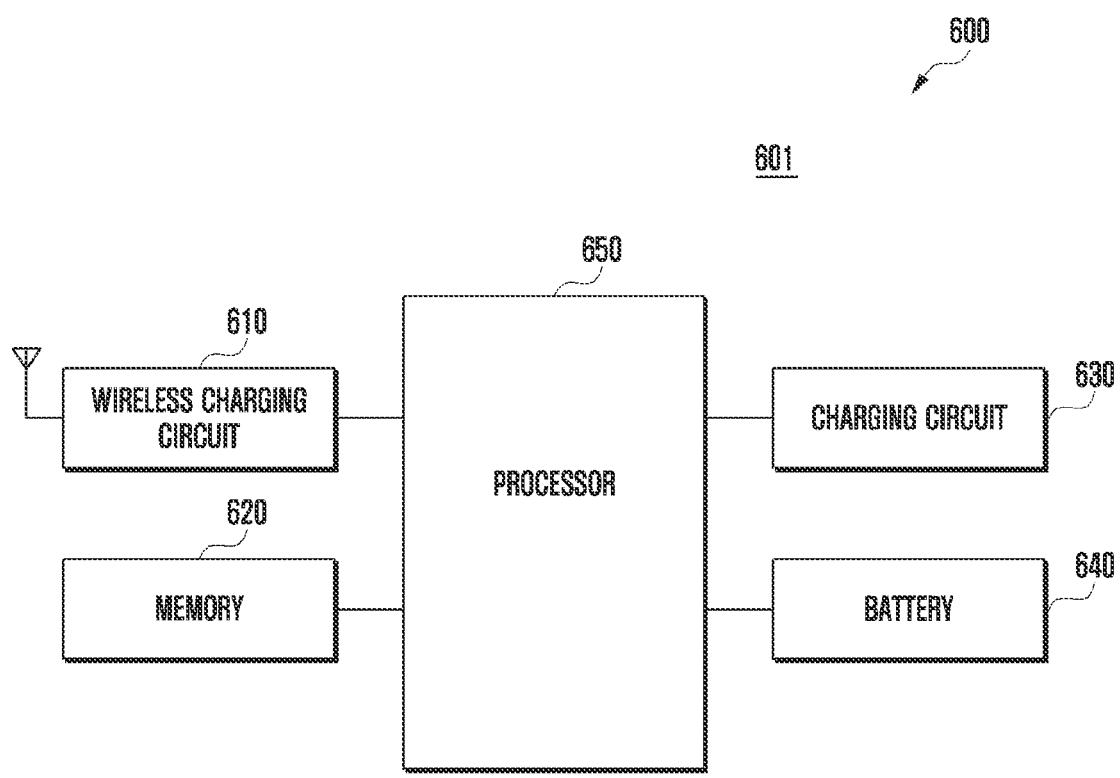
FIG. 6 is a block diagram illustrating a stylus pen according to various embodiments of the disclosure.

FIG. 6 is a block diagram 600 illustrating a stylus pen according to various embodiments of the disclosure.

Referring to FIG. 6, the stylus pen 601 (for example, the stylus pen 221 in FIG. 2 or the stylus pen 445 in FIG. 4) may include a wireless communication circuit 610, a memory 620, a charging circuit 630, a battery 640, and a processor 650.

In an embodiment, the wireless communication circuit 610 may perform communication between the stylus pen 601 and an electronic device (for example, the electronic device 101 in FIG. 1, the electronic device 250 in FIG. 2, the electronic device 401 in FIG. 4 or the electronic device 501 in FIG. 5). The wireless communication circuit 610 may support a short-range wireless communication scheme. For example, the short-range wireless communication scheme may include Bluetooth Low Energy (BLE), but is not limited thereto.

In an embodiment, the memory 620 may store a program for charging the battery 640 of the stylus pen 601 in response to insertion of the stylus pen 601 into the electronic device 101.

In an embodiment, the charging circuit 630 may receive a magnetic field produced in the detecting coil (not illustrated) of the electronic device 101, and may charge the battery 640 by using the received magnetic field. For example, production of a magnetic field in the detecting coil (not illustrated) of the electronic device 101 may cause, by means of electromagnetic induction, a current in the coil (for example, solenoid coil) or in the ferrite core provided in the stylus pen 601. The charging circuit 630 may charge the battery 640 by using the produced current. In an embodiment, the charging circuit 630 may include an EMR charging circuit. The structure of the detecting coil of the electronic device 101 and the coil (for example, solenoid coil) and the ferrite core provided in the stylus pen 601, in an embodiment, will be described in detail with reference to FIG. 7.

In an embodiment, the processor 650 may control the overall operation of the stylus pen 601 and the flow of signals between internal components of the stylus pen 601, and may control supply of power from the battery 640 to the components.

In an embodiment, the processor 650 may charge the battery 640 through the charging circuit 630 by using the current produced in the coil and the ferrite core provided in the stylus pen 601 by the magnetic field produced by the detecting coil (not illustrated) of the electronic device 101 and/or at least one conductor thereof.

Figure 7:
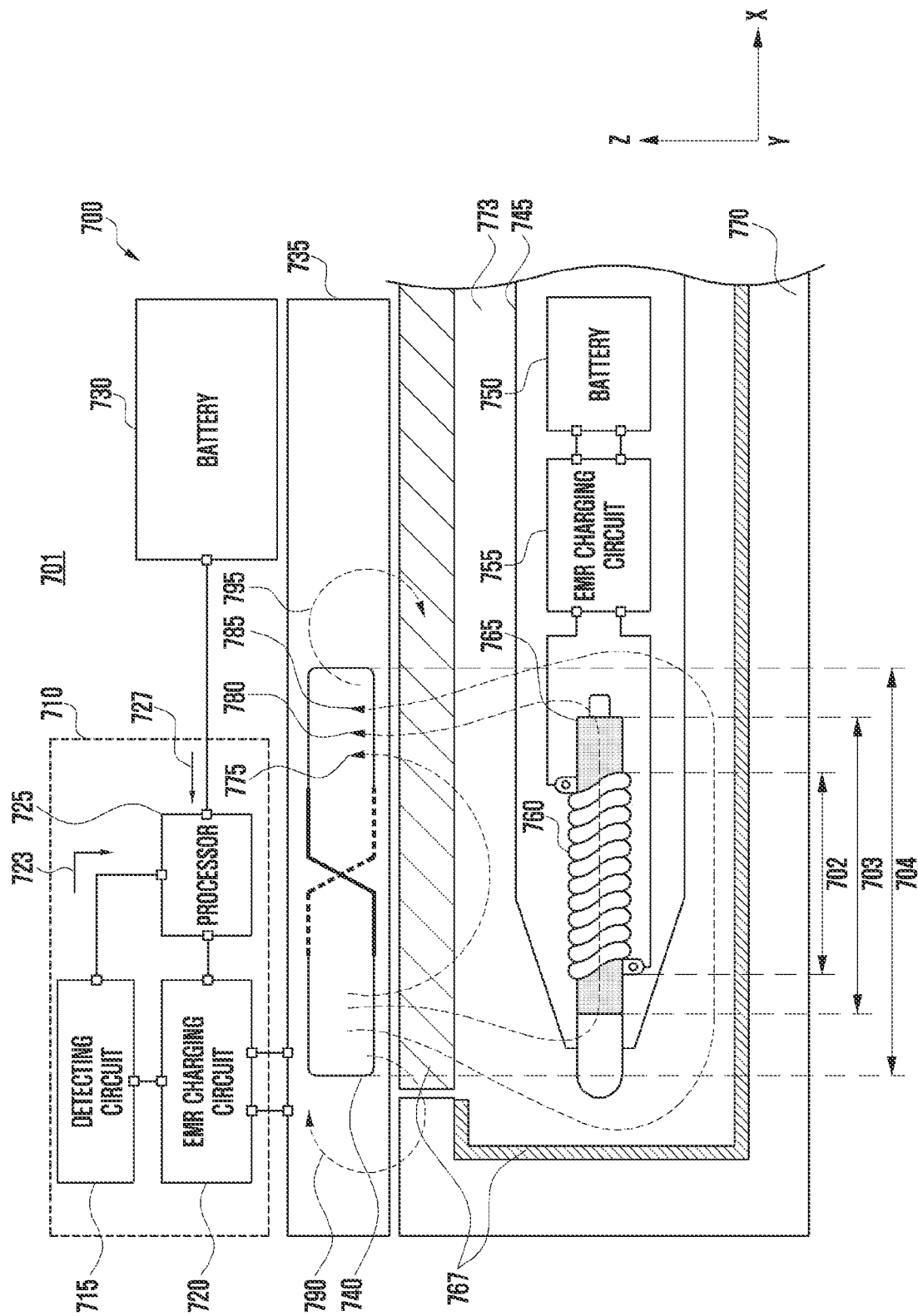
FIG. 7 is a diagram for describing the structure of an electronic device configured to charge a stylus pen according to various embodiments of the disclosure.

FIG. 7 is a diagram 700 for describing the structure of an electronic device configured to charge a stylus pen according to various embodiments of the disclosure.

Referring to FIG. 7, the electronic device 701 (for example, the electronic device 101 in FIG. 1, the electronic device 250 in FIG. 2, the electronic device 401 in FIG. 4, or the electronic device 501 in FIG. 5) may include a detecting circuit 715 (for example, the detecting circuit 520 in FIG. 5), an electro-magnetic resonance (EMR) charging circuit 720 (for example, the charging circuit 550 in FIG. 5), a processor 725 (for example, the processor 570 in FIG. 5), a battery 730 (for example, the battery 560 in FIG. 5), and a detecting coil 740.

In an embodiment, the detecting circuit 715, the EMR charging circuit 720, and the processor 725 may be mounted on a printed circuit board 710 (for example, the printed circuit board 440 in FIG. 4).

In an embodiment, the detecting coil 740 may be mounted on a detecting coil printed circuit board 735 (for example, the magnetic coil flexible printed circuit board 470 in FIG. 4). In an embodiment, the detecting coil 740 may include a flat coil pattern (for example, the flat coil pattern 465 in FIG. 4). In an embodiment, the flat coil pattern 465 may be configured in a specific shape (for example, in the shape of letter "8", the infinity (∞), or the like).

In an embodiment, the housing 770 (for example, the housing 210 in FIG. 2) of the electronic device 701 may have a containing space 773 (for example, the containing space 220 in FIG. 2 or the containing space 415 in FIG. 4) formed on a part thereof such that a stylus pen 745 (for example, the stylus pen 221 in FIG. 2, the stylus pen 445 in FIG. 4, or the stylus pen 601 in FIG. 6) can be inserted therein. In an embodiment, a part of the housing 770 may include a conductive material (for example, a metal) through which a current can flow.

In an embodiment, the inside 767 of the housing 770 may be made of a plastic material. In an embodiment, the inside 767 of the housing 770, if made of a plastic material, may prevent erroneous recognition of the stylus pen 745 by the detecting coil 740, which may otherwise occur due to a frequency attenuation phenomenon and a frequency shifting phenomenon experienced by the stylus pen 745 due to a conductive material (for example, a metal). In an embodiment, the inside 767 of the housing 770, if made of a plastic material, may prevent loss of the magnetic field for charging the stylus pen 475 and may provide a shielding structure that allows the same to circulate inside the containing space 773.

In an embodiment, the stylus pen 745 may include a coil 760 (for example, a solenoid coil), a ferrite core 765, an EMR charging circuit 755 (for example, the charging circuit 630 in FIG. 6), and a battery 750 (for example, the battery 640 in FIG. 6).

In an embodiment, the solenoid coil 760 included in the stylus pen 745 may have a first length 702 while being wound around an axis in the X-axis direction. In an embodiment, the solenoid coil 760 may be electrically connected to the EMR charging circuit 755 and/or the battery 750.

In an embodiment, the ferrite core 765 included in the stylus pen 745 may extend along the X-axis. The ferrite core 765 may have a second length 703 larger than the first length 702. In an embodiment, the solenoid coil 760 may be wound around the ferrite core 765.

In an embodiment, the detecting circuit 715 may detect whether or not the stylus pen 745 is inserted into the containing space 773, based on a change in the current value of the detecting coil 740. Upon detecting insertion of the stylus pen 745 into the containing space 773, the detecting circuit 715 may deliver a detecting signal 723 regarding the insertion to the processor 725.

In an embodiment, the processor 725 may control operations of the detecting coil 740, based on the detecting signal 723 regarding the insertion received from the detecting circuit 715. In an embodiment, the processor 725 may receive a current 727 from the battery 730, based on the detecting signal 723 regarding the insertion received from the detecting circuit 715. The processor 725 may deliver the received current 727 to the detecting coil 740 through the EMR charging circuit 720.

In an embodiment, the detecting coil 740 may be disposed inside the housing 770 so as to face a part of the solenoid coil 760 of the stylus pen 745 when the stylus pen 745 is fully inserted into the housing 770.

In an embodiment, the detecting coil 740 may have a third length 704 larger than the first length 702 of the solenoid coil 760 and the second length 703 of the ferrite core 765.

In an embodiment, the third length of the detecting coil 740, which is larger than the first length 702 and the second length 703, may prevent dispersion of the magnetic field produced in the detecting coil 740, thereby guaranteeing that a magnetic field sufficient to charge the stylus pen 745 can be produced without loss.

In an embodiment, the current received from the EMR charging circuit 720 may produce magnetic fields 775, 780, 785, 790, and 795 in the detecting coil 740. For example, the magnetic fields 775, 780, 785, 790, and 795 may be produced in the detecting coil 740 in the opposite direction to the Z-axis. The magnetic fields 775, 780, 785, 790, and 795 may be produced inside the containing space 773.

In an embodiment, the magnetic fields 775, 780, 785, 790, and 795, if produced by the detecting coil 740, may produce a current in the solenoid coil 760 and the ferrite core 765 of the stylus pen 745 by means of electromagnetic induction. The EMR charging circuit 755 may charge the battery 750 by using the produced current.

Figure 8:
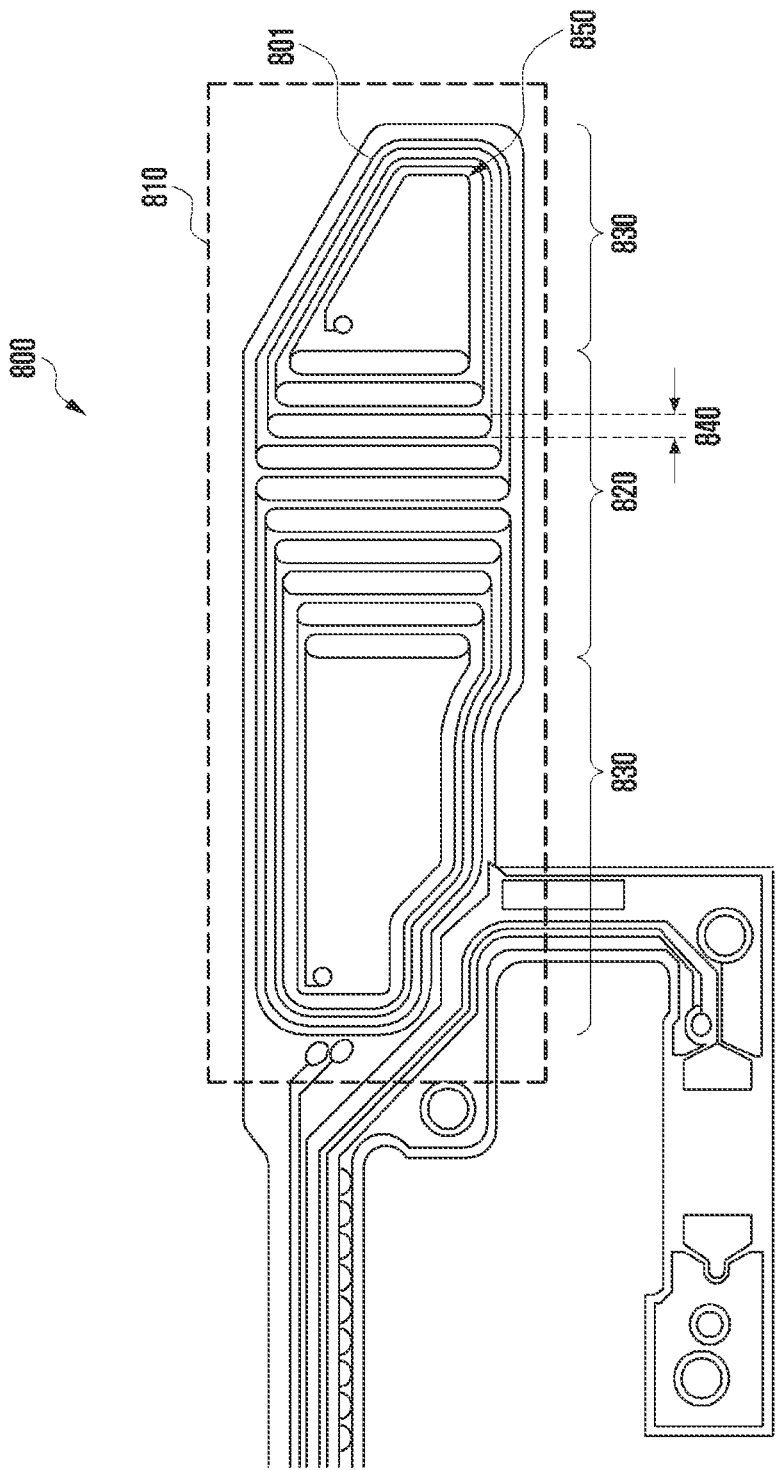
FIG. 8 is a diagram for describing a detecting circuit of an electronic device according to various embodiments of the disclosure.

FIG. 8 is a diagram 800 for describing a detecting circuit of an electronic device according to various embodiments of the disclosure.

Referring to FIG. 8, the detecting coil 810 (for example, the detecting coil 740 in FIG. 7) of the electronic device (for example, the electronic device 101 in FIG. 1, the electronic device 250 in FIG. 2, the electronic device 401 in FIG. 4, the electronic device 501 in FIG. 5, or the electronic device 701 in FIG. 7) may include a conductive wire 801. The conductive wire 801 may extend across a first area 820 and a second area 830, the first area facing the coil of the stylus pen 745, for example, the solenoid coil (for example, the solenoid coil 760 in FIG. 7), and the second area not facing the solenoid coil 760 when the stylus pen (for example, the stylus pen 221 in FIG. 2, the stylus pen 445 in FIG. 4, the stylus pen 601 in FIG. 6, or the stylus pen 745 in FIG. 7) is fully inserted into the housing (for example, the housing 210 in FIG. 2 or the housing 770 in FIG. 7).

In an embodiment, the conductive wire 801 in the first area 820 may have a first width 840, and the conductive wire 801 in the second area 830 may have a second width 850. The second width 850 may be smaller than the first width 840.

In an embodiment, the conductive wire 801 in the first area 820 of the detecting coil 810, which has the first width 840 larger than the second width 850, may thereby lower the impedance value of the detecting coil 810 such that a larger amount of current flows through the detecting coil 810. This may increase the intensity of the magnetic field produced in the detecting coil 810, thereby improving the charging efficiency of the stylus pen 745.

Figure 9:
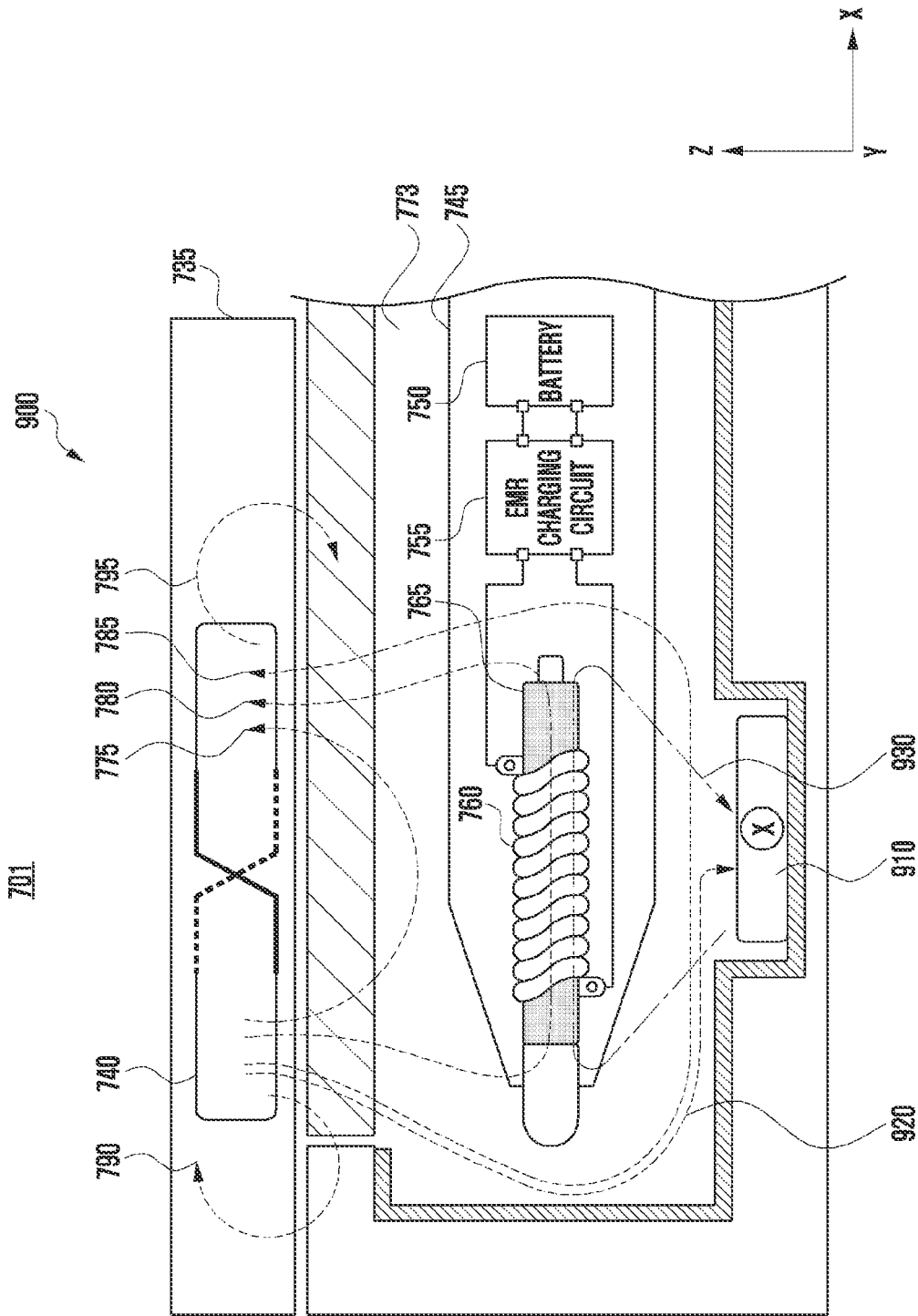
FIG. 9 is a diagram for describing the structure of an electronic device configured to charge a stylus pen according to various embodiments of the disclosure.

FIG. 9 is a diagram 900 for describing the structure of an electronic device configured to charge a stylus pen according to various embodiments of the disclosure.

In an embodiment, the electronic device 701 in FIG. 9 (for example, the electronic device 101 in FIG. 1, the electronic device 250 in FIG. 2, the electronic device 401 in FIG. 4, or the electronic device 501 in FIG. 5) and the stylus pen 745 (for example, the stylus pen 221 in FIG. 2, the stylus pen 445 in FIG. 4, or the stylus pen 601 in FIG. 6) have the same configurations as those of the electronic device 701 and the stylus pen 745 described above with reference to FIG. 7, and repeated descriptions thereof will be omitted herein. Hereinafter, configurations differing from those in FIG. 7 will solely be described with reference to FIG. 9.

Referring to FIG. 9, the electronic device 701 may include a conductor 910. The conductor 910 may be positioned inside the housing (for example, the housing 210 in FIG. 2 or the housing 770 in FIG. 7) of the electronic device 701 so as to face the solenoid coil 760 of the stylus pen 745 with the stylus pen 745 interposed therebetween.

In an embodiment, if the stylus pen 745 is inserted into the containing space 773 formed in a part of the housing, the current received from the EMR charging circuit (for example, the EMR charging circuit 720 in FIG. 7) of the electronic device 701 may produce, in the detecting coil 740, magnetic fields 775, 780, 785, 790, 795, and 920 for charging the battery 750 of the stylus pen 745. For example, magnetic fields 775, 780, 785, 790, 795, and 920 may be produced in the detecting coil 740 in the opposite direction to the Z-axis inside the containing space 773.

In an embodiment, the magnetic fields 775, 780, 785, 790, 795, and 920, if produced in the detecting coil 740, may produce a current in the solenoid coil 760 and the ferrite core 765 of the stylus pen 745 by means of electromagnetic induction.

In an embodiment, the current produced in the solenoid coil 760 and the ferrite core 765 may produce a magnetic field 930 for charging the battery 750 of the stylus pen 745 in the conductor 910. For example, a magnetic field 930 may be produced in the conductor 910 in the Z-axis direction inside the containing space 773.

In an embodiment, if the magnetic field 930 is produced in the conductor 910, a current may be produced in the solenoid coil 760 and the ferrite core 765 by means of electromagnetic induction.

In an embodiment, the EMR charging circuit 755 may charge the battery 750 by using the magnetic fields 775, 780, 785, 790, 795, and 920 produced by the current produced in the detecting coil 740, and the magnetic field 930 produced by the current produced in the conductor 910.

Figure 10:
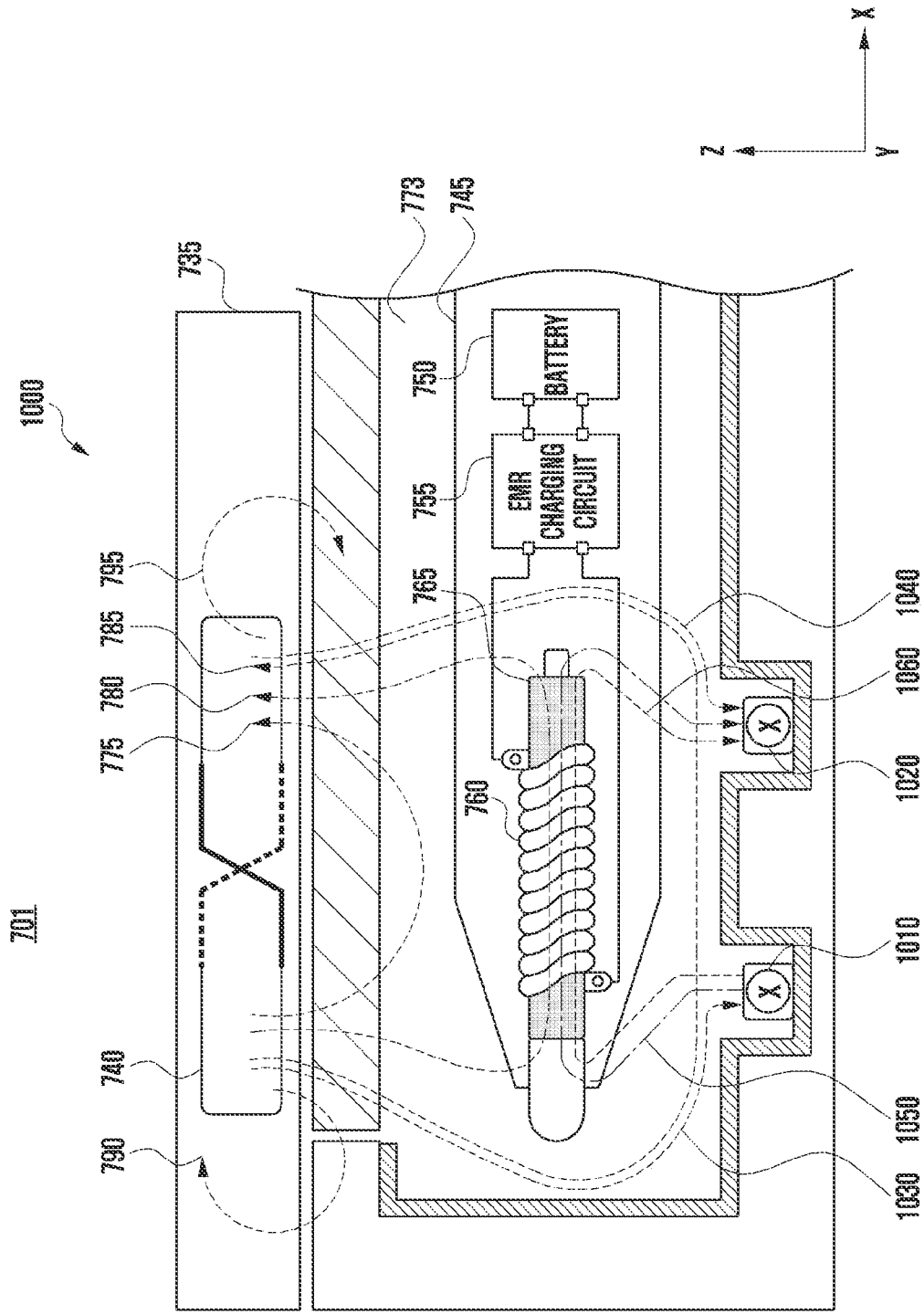
FIG. 10 is a diagram for describing the structure of an electronic device configured to charge a stylus pen according to various embodiments of the disclosure.

FIG. 10 is a diagram 1000 for describing the structure of an electronic device configured to charge a stylus pen according to various embodiments of the disclosure.

In an embodiment, the electronic device 701 in FIG. 10 (for example, the electronic device 101 in FIG. 1, the electronic device 250 in FIG. 2, the electronic device 401 in FIG. 4, or the electronic device 501 in FIG. 5) and the stylus pen 745 (for example, the stylus pen 221 in FIG. 2, the stylus pen 445 in FIG. 4, or the stylus pen 601 in FIG. 6) have the same configurations as those of the electronic device 701 and the stylus pen 745 described above with reference to FIG. 7, and repeated descriptions thereof will be omitted herein. Hereinafter, configurations differing from those in FIG. 7 will solely be described with reference to FIG. 10.

Referring to FIG. 10, the electronic device 701 may include at least two conductors 1010 and 1020 (for example, the conductor 910 in FIG. 9). In an embodiment, the at least two conductors 1010 and 1020 may be disposed inside the housing (for example, the housing 210 in FIG. 2 or the housing 770 in FIG. 7) of the electronic device 701 so as to face at least a partial area of the ferrite core 765 of the stylus pen 745 with the stylus pen 745 interposed therebetween. For example, the at least two conductors 1010 and 1020 may be disposed so as to face both end areas of the ferrite core 765.

In an embodiment, if the stylus pen 745 is inserted into the containing space 773 formed in a part of the housing, magnetic fields 775, 780, 785, 790, 795, 1030, and 1040 for charging the battery 750 of the stylus pen 745 may be produced in the detecting coil 740 by the current received from the EMR charging circuit (for example, the EMR charging circuit 720 in FIG. 7) of the electronic device 701. For example, the magnetic fields 775, 780, 785, 790, 795, 1030, and 1040 may be produced in the detecting coil 740 in the opposite direction to the Z-axis inside the containing space 773.

In an embodiment, if the magnetic fields 775, 780, 785, 790, 795, 1030, and 1040 are produced in the detecting coil 740, a current may be produced in the solenoid 760 and the ferrite core 765 of the stylus pen 745 by means of electromagnetic induction.

In an embodiment, the current produced in the solenoid 760 and the ferrite core 765 may produce magnetic fields 1050 and 1060 for charging the battery 750 of the stylus pen 745 in the at least two conductors 1010 and 1020. For example, magnetic fields 1050 and 1060 may be produced in the conductors 1010 and 102 in the Z-axis direction inside the containing space 773.

In an embodiment, the magnetic fields 1050 and 1060, if produced in the at least two conductors 1010 and 1020, may produce a current in the solenoid coil 760 and the ferrite core 765 by means of electromagnetic induction.

In an embodiment, the EMR charging circuit 755 may charge the battery 750 by using the magnetic fields 775, 780, 785, 790, 795, 1030, and 1040 produced by the current produced in the solenoid coil 760 and the ferrite core 765, and the magnetic fields 1050 and 1060 produced by the current produced in the at least two conductors 1010 and 1020.

According to an embodiment, in FIG. 9 and FIG. 10, provision of one or more conductors 910, 1010, and 1020 inside the electronic device 701 may increase the current for charging the battery 750 of the stylus pen 745, thereby shortening the time necessary to charge the stylus pen 745. For example, provision of one or more conductors 910, 1010, and 1020 inside the electronic device 701 may not only produce a magnetic field in the detecting coil 740 in the opposite direction to the Z-axis, but also produce a magnetic field in the Z-axis direction by means of the one or more conductors 910, 1010, and 1020, thereby increasing the current for charging.

In an embodiment, it can be identified with reference to Table 1 below that, if at least one conductor according to FIG. 9 and FIG. 10 is provided, the charging time is 34 seconds, which is improved by 14% compared with the prior art. In an embodiment, it can be identified that, if a detecting coil having an expanded pattern according to FIG. 7 and FIG. 8 is provided, the charging time is 35 seconds, which is improved by 11.5% compared with the prior art. In an embodiment (not illustrated), it can be identified that, if a detecting coil having at least one conductor and an expanded pattern is provided, the charging time is 30 seconds, which is improved by 24.1% compared with the prior art.

TABLE 1

|  | Prior art | Conductor disposed | Detecting coil pattern expanded | Conductor disposed & detecting coil pattern expanded |
| --- | --- | --- | --- | --- |
| Time taken for charging | 39.55 sec | 34 sec | 35 sec | 30 sec |
| Ratio of improvement |  | 14% | 11.5% | 24.1% |

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a housing comprising a first plate, a second plate facing away from the first plate, and a side member surrounding a space between the first plate and the second plate;
   a hole formed through the side member and connected to the space;
   a stylus pen which can be inserted into the space through the hole, the stylus pen comprising a pen housing elongated between a first end and a second end, and a first coil positioned inside the pen housing and wound around an axis in a first direction extending from the first end to the second end, the first coil having a coil length corresponding to a first length;
   a second coil disposed in the space of the housing so as to face a part of the first coil of the stylus pen when the stylus pen is fully inserted into the housing, the second coil comprising a conductive wire extending across a first area facing the first coil and a second area not facing the first coil, the conductive wire having a first width in the first area and having a second width smaller than the first width in the second area;
   a charging circuit electrically connected to the second coil; and
   a first conductor and a second conductor positioned inside the housing,
   wherein the stylus pen comprises a ferrite core extending along the axis, and the first coil is wound around the ferrite core, and
   wherein the first conductor is disposed to face a first area of a first end of the ferrite core, and the second conductor is disposed to face a second area of a second end of the ferrite core.

2. The electronic device of claim 1, wherein the ferrite core has a second length larger than the first length.

3. The electronic device of claim 2, wherein the second coil has a third length larger than the second length.

4. The electronic device of claim 1, wherein the stylus pen further comprises a battery electrically connected to the first coil.

5. The electronic device of claim 1, wherein the first coil comprises a solenoid coil.

6. The electronic device of claim 1, wherein the second coil is formed on a plane facing the stylus pen.

7. The electronic device of claim 1, further comprising a conductor positioned inside the housing so as to face the first coil with the stylus pen interposed therebetween, instead of the first conductor and the second conductor being disposed therebetween.

8. The electronic device of claim 1, further comprising a processor configured so as to produce a magnetic field in the second coil by using a current received from the charging circuit when the stylus pen is fully inserted into the housing.

9. The electronic device of claim 8, wherein the first coil is configured to produce a current by using a magnetic field produced by the second coil.

10. The electronic device of claim 9, wherein the processor is configured to produce a magnetic field in the first conductor and the second conductor by using the produced current when the stylus pen is fully inserted into the housing.

11. The electronic device of claim 10, wherein the first coil is configured to produce a current by using a magnetic field produced by the first conductor and the second conductor.

12. The electronic device of claim 11, wherein the stylus pen further comprises a charging circuit electrically connected to the first coil, and the stylus pen is configured to charge a battery of the stylus pen through the charging circuit by using the current produced in the first coil and the current produced in the first conductor and the second conductor.

13. An electronic device comprising:
   a housing comprising a first plate, a second plate facing away from the first plate, and a side member surrounding a space between the first plate and the second plate;
   a hole formed through the side member and connected to the space;
   a stylus pen which can be inserted into the space through the hole, the stylus pen comprising a pen housing elongated between a first end and a second end, and a first coil positioned inside the pen housing and wound around an axis in a first direction extending from the first end to the second end, the first coil having a coil length corresponding to a first length;
   a second coil disposed in the space of the housing so as to face a part of the first coil of the stylus pen when the stylus pen is fully inserted into the housing;

a charging circuit electrically connected to the second coil;
a first conductor and a second conductor positioned inside the housing,
wherein the stylus pen comprises a ferrite core extending along the axis, and the first coil is wound around the ferrite core, and
wherein the first conductor is disposed to face a first area of a first end of the ferrite core, and the second conductor is disposed to face a second area of a second end of the ferrite core.

* * * * *